(12) United States Patent
Lee et al.

(10) Patent No.: US 10,140,412 B2
(45) Date of Patent: Nov. 27, 2018

(54) TIMING MATCHING METHOD OF TIMING ANALYZER AND METHOD OF DESIGNING INTEGRATED CIRCUIT USING THE SAME

(71) Applicants: Inyoul Lee, Suwon-si (KR); Jye-Hak Lee, Seongnam-si (KR)

(72) Inventors: Inyoul Lee, Suwon-si (KR); Jye-Hak Lee, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 509 days.

(21) Appl. No.: 14/806,693

(22) Filed: Jul. 23, 2015

(65) Prior Publication Data

US 2016/0117435 A1 Apr. 28, 2016

(30) Foreign Application Priority Data

Oct. 22, 2014 (KR) ........................ 10-2014-0143511

(51) Int. Cl.
*G06F 17/50* (2006.01)

(52) U.S. Cl.
CPC ........ *G06F 17/5081* (2013.01); *G06F 17/505* (2013.01); *G06F 17/5031* (2013.01); *G06F 17/5068* (2013.01)

(58) Field of Classification Search
CPC ............. G06F 17/5081; G06F 17/5068; G06F 17/505; G06F 17/5031
USPC ....................................................... 716/112
See application file for complete search history.

(56) References Cited

U.S. PATENT DOCUMENTS

| | | | | |
|---|---|---|---|---|
| 5,568,395 | A | * | 10/1996 | Huang ................ G06F 17/5036 703/13 |
| 6,457,159 | B1 | * | 9/2002 | Yalcin ................ G06F 17/5022 716/104 |
| 6,990,646 | B2 | | 1/2006 | Yoshikawa |
| 7,131,079 | B2 | * | 10/2006 | Wu ..................... G06F 17/5022 716/103 |
| 7,506,293 | B2 | | 3/2009 | Dasdan et al. |
| 7,594,202 | B2 | * | 9/2009 | de Dood ............... G06F 17/505 716/106 |
| 7,644,378 | B2 | * | 1/2010 | Wang .................... G06F 17/504 716/116 |
| 7,840,923 | B2 | | 11/2010 | McCoo et al. |
| 8,332,793 | B2 | | 12/2012 | Bose |
| 8,522,188 | B2 | | 8/2013 | Kim et al. |
| 8,813,056 | B2 | | 8/2014 | Buchard et al. |
| 9,043,737 | B2 | * | 5/2015 | Bahadra ............. G06F 17/5031 716/104 |

(Continued)

FOREIGN PATENT DOCUMENTS

| | | |
|---|---|---|
| JP | 2001-306646 A | 11/2001 |
| JP | 2002-208089 A | 7/2002 |

(Continued)

*Primary Examiner* — Jack Chiang
*Assistant Examiner* — Brandon Bowers
(74) *Attorney, Agent, or Firm* — Volentine, Whitt & Francos, PLLC

(57) ABSTRACT

A timing-matching method, executed by a timing analyzer, that includes computing a slew or load of a cell, determining whether the slew or load exists in an extrapolation region of a standard cell look-up table, and swapping the cell with a virtual standard cell of a virtual standard cell look-up table when the slew or load exists in the extrapolation region.

17 Claims, 12 Drawing Sheets

(56) References Cited

U.S. PATENT DOCUMENTS

2010/0262939 A1* 10/2010 Zahn .................. G06F 17/5031
　　　　　　　　　　　　　　　　　716/132

FOREIGN PATENT DOCUMENTS

KR　　10-2004-0046284 A　　6/2004
KR　　　　10-0595534 B1　　6/2006

* cited by examiner

TIMING MATCHING METHOD OF TIMING ANALYZER AND METHOD OF DESIGNING INTEGRATED CIRCUIT USING THE SAME

CROSS-REFERENCE TO RELATED APPLICATIONS

This U.S. non-provisional patent application claims priority under 35 U.S.C. § 119 to Korean Patent Application No. 10-2014-0143511 filed Oct. 22, 2014, the entire contents of which are hereby incorporated by reference.

BACKGROUND

Embodiments of the application described herein relate to a timing matching method of a timing analyzer and a method of designing an integrated circuit using the same.

A memory device, an application specific random access memory (ASIC), etc. are released to the market through a series of steps, such as design and process steps of a semiconductor circuit, a chip test step, and a test step after packaging the semiconductor circuit. In order to search for a timing error which occurs on a circuit in a very large scale integration (VLSI) design, there are a dynamic timing analysis (DTA), a static timing analysis (STA), etc.

In the DTA, a timing relation between memory devices in a circuit is studied by applying a test stimulus of a certain type to the circuit. Accordingly, weak points of the circuit are searched for and mitigated.

In the STA, paths which may perform unstable operations are searched for and analyzed in consideration of all signal transmission paths which exist among memory devices configuring a circuit, without applying a test stimulus of a specific type to the circuit. In the STA, timing between signals input and output to or from a designed semiconductor memory or logic is analyzed, and thus the designed semiconductor circuit or logic is tested about whether it may be normally operated without a problem in the timing.

The STA is performed by an STA tool (e.g., PrimeTime). If the designed semiconductor circuit or logic is input in the STA tool, the STA tool extracts delay models corresponding to the input semiconductor circuit or logic from delay models for various cells stored in its database, such as transistors, cells of a gate level, cells of a unit logic (e.g., AND, OR, etc.) level, or cells of special functions (e.g., sense amplifier-based flip flops, etc. in which it is difficult to compute a delay between input and output). The STA tool analyzes timing between input and output signals and reports delay values among nodes which exit in the semiconductor circuit or logic.

SUMMARY

An aspect of the application is to provide a timing matching method of a timing analyzer for performing timing matching without increasing a chip size and a method of designing an integrated circuit.

In accordance with an aspect of the application, a timing matching method, executed by a timing analyzer, for analyzing timing of an integrated circuit is provided. The timing matching method may include computing a slew or load of a cell, determining whether the slew or load exists in an extrapolation region of a standard cell look-up table, and swapping the cell with a virtual standard cell in at least one virtual standard cell look-up table, when the slew or load exists in the extrapolation region.

The cell may have the same size as that of the virtual standard cell.

The standard cell look-up table may be a table associated with timing matching of standard cells used in an LSI design.

The virtual standard cell look-up table may be a table associated with timing matching of virtual standard cells used in a memory chip design.

The timing matching method may further include determining whether the cell is a cell used in a memory chip, when the slew or load exists in the extrapolation region.

The timing matching method may further include swapping the cell with the virtual standard cell, when the cell is the cell used in the memory chip.

The timing matching method may further include inserting a buffer into an input end of the cell or converting a size of a buffer in the input end of the cell, when the cell is not the cell used in the memory chip.

The timing matching method may further include swapping the cell with a standard cell in the standard cell look-up table, when a timing violation occurs in a timing analysis of the cell.

The timing matching method may further include computing a slew or load of the virtual standard cell, after swapping the cell with the virtual standard cell.

The timing matching method may further include determining whether the slew or load of the virtual standard cell exists in a virtual interpolation region (VIR) of the virtual standard cell look-up table.

The timing matching method may further include generating a standard delay format (SDF) file, when there is no timing violation in a timing analysis of the cell or virtual standard cell.

The timing matching method may further include performing a dynamic simulation using the SDF file and a gate level netlist.

In accordance with another aspect of the application, a timing matching method, executed by a timing analyzer, for analyzing timing of an integrated circuit is provided. The timing matching method may include determining whether a transition time of a cell exists in an extrapolation region of a standard cell look-up table, swapping the cell with a virtual standard cell in at least one virtual standard cell look-up table, when the transition time of the cell exists in the extrapolation region, and determining whether a transition time of the virtual standard cell exists in a virtual interpolation region of the at least one virtual standard cell look-up table.

The virtual interpolation region may be included in the extrapolation region.

The virtual standard cell may be used in a cell associated with a data path, when the integrated circuit is a memory chip.

In accordance with another aspect of the application, a method of designing an integrated circuit is provided. The method may include performing a schematic design with a gate level, determining there is a cell whose transition time exists in an extrapolation region of a standard cell look-up table among cells in which the schematic design is performed, swapping the cell which exists in the extrapolation region with a virtual standard cell of a virtual standard cell look-up table, performing a static timing analysis operation of a schematic design in which the cell is swapped with the virtual standard cell, generating a standard delay format file, when there is no timing violation in the static timing analysis operation, and performing a dynamic simulation using the standard delay format file and a gate level netlist.

The method may further include inserting synchronized clocks by dividing one clock source, after performing the schematic design.

The method may further include performing a physical design by placing and routing cells using the gate level netlist, after performing the dynamic simulation.

The method may further include verifying the physical design through a design rule check (DRC), a layout and netlist comparison check (LVS), or an electronic rule check (ERC).

The integrated circuit may be a memory chip.

In accordance with another aspect of the application, a design system for designing a memory chip is provided. The design system may include a database configured to store a cell library, a gate level netlist, and layout data. A memory is configured to load a place and routing tool for generating the layout data for the memory chip by placing and routing components of the memory chip based on the cell library and the gate level netlist. A static timing analysis tool analyzes timing of a designed memory chip. A processor is configured to execute the place and routing tool and the static timing analysis tool using the cell library, the gate level netlist, or the layout data, wherein the static timing analysis tool swaps a cell with a standard cell of a standard cell look-up table in a timing violation of the cell, or swaps the cell with a virtual standard cell of an extrapolation region of the standard cell look-up table.

The standard cell look-up table may be a table associated with standard cells used in an LSI design.

The design system may further include a plurality of virtual standard cell look-up tables which exist in the extrapolation region.

The STA tool may be PrimeTime.

In accordance with another aspect of the application, there is provided a method, executed by a computer, for improving signal synchronicity within an integrated circuit design, the method executed for a component of the integrated circuit design. The method includes performing a register transfer level (RTL) design/logic synthesis for the integrated circuit design; computing, from the RTL design/logic synthesis, a range of values for a parameter of the component that must be maintained to avoid a fault occurrence during an analyzed operation of the integrated circuit design; determining, from the RTL design/logic synthesis, whether the parameter value of the component will be maintained within the range for the analyzed operation of the integrated circuit design; and replacing within the integrated circuit design, if the determination is negative, the component with another component having a parameter value within the range for the analyzed operation.

The method may further include executing either a static timing analysis or a dynamic timing analysis of a portion of the integrated circuit design having the replaced component.

The method may further include executing the computing, determining, and replacing operations for a plurality of components within the integrated circuit design.

The parameter is a slew or load of the component.

The other component may have the same physical size as the component within a realized integrated circuit.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
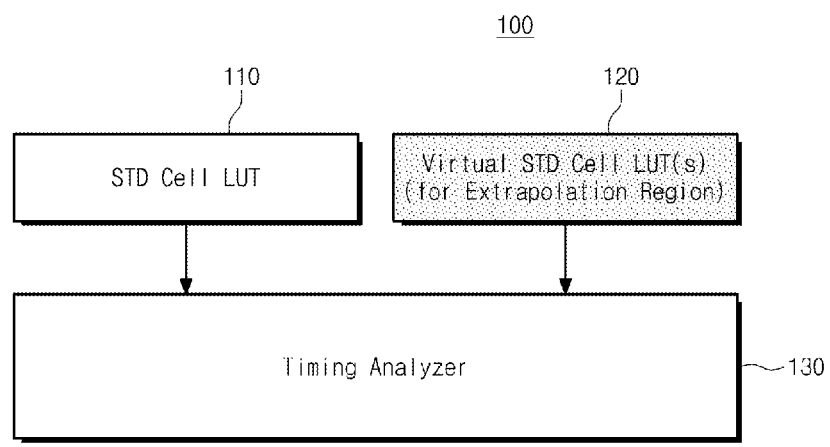
FIG. 1 is a block diagram illustrating a concept of a timing analysis method of a timing analysis system according to an exemplary embodiment of the application.

Embodiments will be described in detail with reference to the accompanying drawings. The application, however, may be embodied in various different forms, and should not be construed as being limited only to the illustrated embodiments. Rather, these embodiments are provided as examples so that this disclosure will be thorough and complete, and will fully convey the concept of the application to those skilled in the art. Accordingly, known processes, elements, and techniques are not described with respect to some of the embodiments of the application. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the application.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this application belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

A semiconductor design of a semiconductor memory, a system on chip (SoC), etc. may be verified by a timing analysis. In general, a timing closure method may use a static timing analysis (STA) and a method of removing slacks of setup/hold violation. Timing verification of a memory chip, such as a flash memory device, must be performed using a semi-custom environment which differs from an SoC environment. That is, the timing verification of the memory chip may be performed using the STA at a specific portion, but it may also be performed using a simulation based on a standard delay format (SDF) at the other portion.

Particularly, a flash memory device may be constructed with a scheduler which operates a high-speed data path and a low-speed core sequence. In the timing analysis of the memory chip which uses these low-speed/high-speed paths together, it is not easy to secure timing matching properties. When a maximum transition time violation (MTTV) occurs in a typical SoC design, a transition time is corrected within the maximum slope range by converting a buffer size or inserting a buffer. However, when increasing a buffer size or inserting a buffer in a memory chip, a considerable overhead for a chip size occurs.

A timing analysis scheme according to an exemplary embodiment of the application may implement timing matching, which does not cause an overhead for a chip size, through a swap operation of a virtual standard (STD) cell in addition to a STD cell.

FIG. 1 is a block diagram illustrating a concept of a timing analysis method of a timing analysis system according to an exemplary embodiment of the application.

Referring to FIG. 1, the timing analysis system 100 may include a standard (STD) cell look-up table (LUT) 110, at least one virtual STD cell LUT 120, and a timing analyzer 130.

The STD cell LUT 110 may be an LUT associated with timing matching of STD cells that are normally used for timing matching in an LSI design. The STD cells may include the following: transistors, cells of a gate level, unit logic cells (e.g., AND, OR, NAND, etc.), buffers, inverters, and flip-flop. A timing matching LUT may indicate a plurality of STD cell regions classified by loads and slews. That is, the STD cell LUT 110 may indicate STD cells which satisfy loads within a predetermined range and slews within a predetermined range.

The virtual STD cell LUT 120 may be an LUT associated with timing matching of virtual STD cells for timing matching of cells which exist in an extrapolation region (ER) of the STD cell LUT 110. The virtual STD cells may be cells that are used in a design of a special purpose. For example, the virtual STD cells may be cells that are used in a design associated with paths of a memory chip. In an exemplary embodiment of the application, each of the virtual STD cells may have the same size as that of each of corresponding STD cells.

The timing analyzer 130 may be used for analyzing timing of an integrated circuit. Herein, the integrated circuit may be an SoC, an ASIC, or a field programmable gate array (FPGA).

The timing analyzer 130 may extract a delay model corresponding to each of cells, which exist in a designed circuit or logic, from delay models of various cells stored in a database, may analyze timing between input and output signals, and may report delay values between nodes which exist in the circuit or logic. Particularly, the timing analyzer 130 may determine whether a timing violation occurs and may correct the timing violation by performing a test associated with timing of a target cell in the circuit. For example, the timing analyzer 130 may test the following of the target cell: a setup time, a hold time, and a skew.

In one exemplary embodiment of the application, in the timing violation of the target cell, the timing analyzer 130 may swap the target cell with a STD cell using the STD cell LUT 110 to perform timing matching.

In another exemplary embodiment of the application, in a timing violation of a target cell, when timing of the target cell exists in an ER of the STD cell LUT 110, the timing analyzer 130 may swap the target cell with a virtual STD cell using the virtual STD cell LUT 120 to perform timing matching. For example, if the target cell is a cell associated with a path of a memory chip, the target cell may be swapped with a virtual STD cell to perform timing matching and overcome the timing violation. Herein, the virtual STD cell may have the same size as a STD cell corresponding to the virtual STD cell.

In one exemplary embodiment of the application, the timing analyzer 130 may perform an STA. In the STA, the timing analyzer 130 may analyze all critical paths on a design and may provide a report. This report may include debugging information such as a fan-out or load of each net.

In another exemplary embodiment of the application, the timing analyzer 130 may perform a dynamic timing analysis (DTA).

In a typical timing analysis method, a buffer size is changed or a buffer is added to perform timing matching of a target cell which exists in an ER. However, this timing analysis method causes an increase in a chip size of a memory chip in which timing violation occurs frequently.

In contrast, the timing analysis system 100 according to an exemplary embodiment of the application may implement timing matching by swapping a target cell which exists in an extrapolation region ER with a virtual STD cell in the virtual STD cell LUT 120. Therefore, the timing analysis system 100 may implement timing matching without increasing a chip size.

Figure 2:
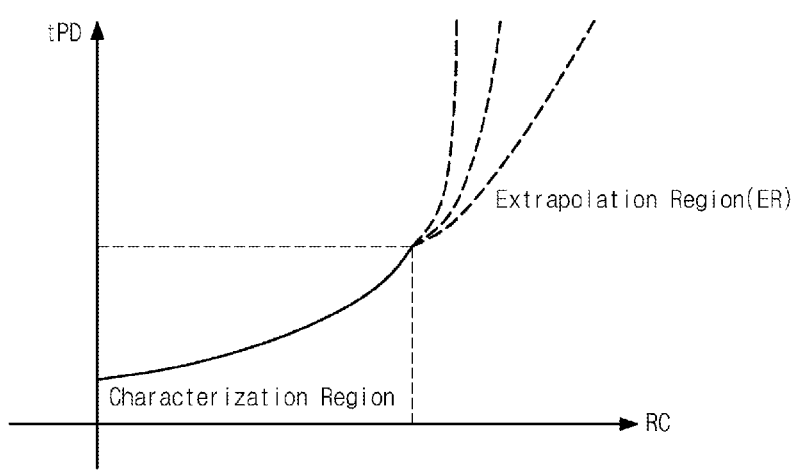
FIG. 2 is a waveform chart illustrating an extrapolation region (ER) schematically according to an exemplary embodiment of the application.

FIG. 2 is a waveform chart illustrating an extrapolation region schematically according to an exemplary embodiment of the application.

Referring to FIG. 2, a characterization region that is set according to a relation between a propagation delay time tPD and time constant RC is shown. The characterization region may be implemented by timing characteristics (e.g., loads and slews) which exist in a STD cell LUT 110 (refer to FIG. 1). In contrast, a region which gets out of the characterization region, that is, a region which may not be implemented by the timing characteristics (e.g., loads and slews) of the STD cell LUT 110 may be an extrapolation region ER.

A timing analysis method according to an exemplary embodiment of the application may swap a target cell of the extrapolation region ER with a STD cell (e.g., a STD cell included in the STD cell LUT 110) of a characterization region to perform timing matching, or may swap a target cell of the extrapolation region ER with a virtual STD cell (e.g., a virtual STD cell included in a virtual STD cell LUT 120 (refer to FIG. 1)) of a virtual interpolation region VIR to perform timing matching.

In FIGS. 3 to 6 shown below, assuming that a target cell is an inverter for better understanding and ease of description, a timing analysis method according to an exemplary embodiment of the application will be described in details.

Figure 3:
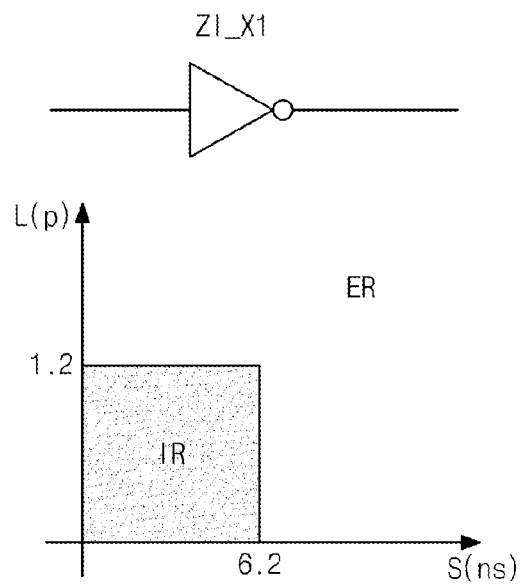
FIG. 3 is a drawing showing an exemplary interpolation region (IR) and an extrapolation region (ER) of a STD cell Z1_X1 based on a STD cell look-up table (LUT) shown in FIG. 1.

FIG. 3 is a diagram showing an exemplary interpolation region IR and an exemplary extrapolation region ER of a STD cell Z1_X1 based on a STD cell LUT shown in FIG. 1.

Referring to FIG. 3, a characterization region which may be implemented according to slews and loads of a STD cell Z1_X1 in a STD cell LUT 110 (refer to FIG. 1) and may be identified as an IR, and the other region may be an extrapolation region ER. For example, as shown in FIG. 3, slews S of the STD cell Z1_X1 in an interpolation region IR which exists in the STD cell LUT 110 may be within the range between 0 ns and 6.2 ns, and loads L thereof may be within the range between 0 p and 1.2 p.

A timing analyzer 130 (refer to FIG. 1) may test a timing violation of a target cell. In the timing violation of the target cell, the timing analyzer 130 may swap the target cell with the STD cell Z1_X1 of the IR to perform timing matching of the target cell.

Figure 4:
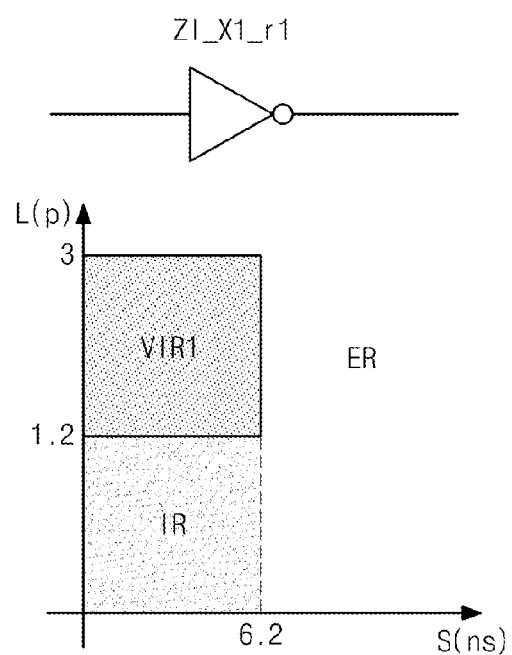
FIG. 4 is a drawing showing an exemplary first virtual VIR VIR1 for a virtual STD cell Z1_X1_r1 based on a virtual STD cell LUT on an ER shown in FIG. 3.

FIG. 4 is a drawing showing an exemplary first virtual interpolation region VIR1 for a virtual STD cell Z1_X1_r1 based on a virtual STD cell LUT in an extrapolation region ER shown in FIG. 3.

Referring to FIG. 4, a characterization region which may be implemented according to slews and loads of a virtual STD cell Z1_X1_r1 which exists in a virtual STD cell LUT 120 (refer to FIG. 1) may be a virtual interpolation region VIR1. For example, as shown in FIG. 4, slews S of the virtual STD cell Z1_X1_r1 which exist in the virtual STD cell LUT 120 may be within the range between 0 ns and 6.2 ns, and loads L thereof may be within the range between 1.2 p and 3 p.

A timing analyzer 130 (refer to FIG. 1) may test a timing violation of a target cell. When the target cell exists in an extrapolation region ER in the timing violation of the target cell, the timing analyzer 130 may swap the target cell with the virtual STD cell Z1_X1_r1 of the VIR1 to perform timing matching of the target cell. Herein, the virtual STD cell Z1_X1_r1 has the same size as that of a STD cell Z1_X1 shown in FIG. 3.

Figure 5:
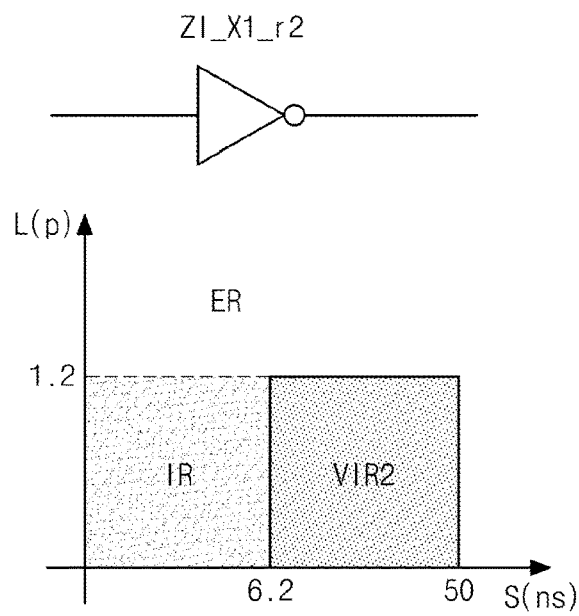
FIG. 5 is a drawing showing an exemplary second VIR VIR2 for a virtual STD cell Z1_X1_r2 based on a virtual STD cell LUT on an ER shown in FIG. 3.

FIG. 5 is a drawing showing an exemplary second virtual interpolation region VIR2 for a virtual STD cell Z1_X1_r2 based on a virtual STD cell LUT in an extrapolation region ER shown in FIG. 3.

Referring to FIG. 5, a characterization region which may be implemented according to slews and loads of a virtual STD cell Z1_X1_r2 which exists in a virtual STD cell LUT 120 (refer to FIG. 1) and may be identified as a virtual interpolation region VIR2. For example, as shown in FIG. 5, slews S of the virtual STD cell Z1_X1_r2 which exists in the virtual STD cell LUT 120 may be within the range between 6.2 ns and 50 ns, and loads L thereof may be within the range between 0 p and 1.2 p.

A timing analyzer 130 (refer to FIG. 1) may test a timing violation of a target cell. When the target cell exists in an ER in the timing violation of the target cell, the timing analyzer 130 may swap the target cell with the virtual STD cell Z1_X1_r2 of the VIR2 to perform timing matching of the target cell. Herein, the virtual STD cell Z1_X1_r2 has the same size as that of a STD cell Z1_X1 shown in FIG. 3.

Figure 6:
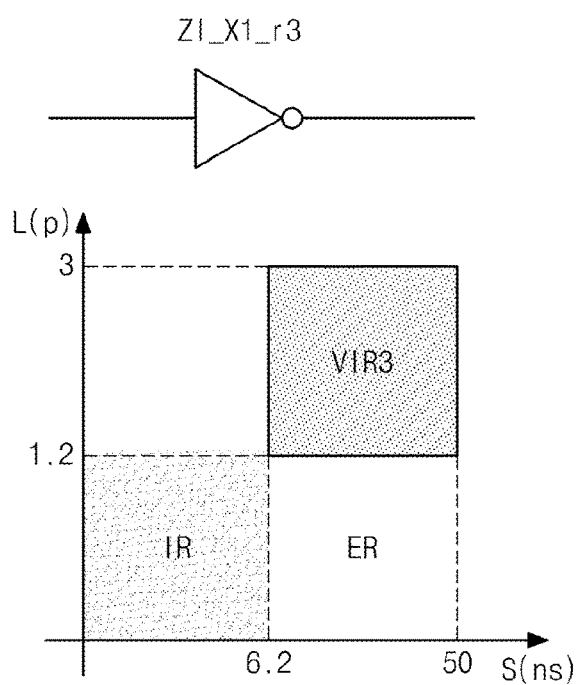
FIG. 6 is a drawing showing an exemplary third VIR VIR3 for a virtual STD cell Z1_X1_r3 based on a virtual STD cell LUT on an ER shown in FIG. 3.

FIG. 6 is a drawing showing an exemplary third virtual interpolation region VIR3 for a virtual STD cell Z1_X1_r3 based on a virtual STD cell LUT in an extrapolation region ER shown in FIG. 3.

Referring to FIG. 6, a characterization region which may be implemented according to slews and loads of a virtual STD cell Z1_X1_r3 which exists in a virtual STD cell LUT 120 (refer to FIG. 1) may be a virtual interpolation region VIR3. For example, as shown in FIG. 6, slews S of the virtual STD cell Z1_X1_r3 which exists in the virtual STD cell LUT 120 may be within the range between 6.2 ns and 50 ns, and loads L thereof may be within the range between 1.2 p and 3 p.

A timing analyzer 130 (refer to FIG. 1) may test a timing violation of a target cell. When the target cell exists in an ER in the timing violation, the timing analyzer 130 may swap the target cell with the virtual STD cell Z1_X1_r3 of the VIR3 to perform timing matching of the target cell. Herein, the virtual STD cell Z1_X1_r3 has the same size as that of a STD cell Z1_X1 shown in FIG. 3.

Meanwhile, detailed values of slews S and loads L shown in FIGS. 3 to 6 are values to help to understand the exemplary embodiment of the application and are not to be construed as limiting the exemplary embodiment of the application. Also, the number of the VIRs which exist in the ER associated with the STD cell LUT 110 according to the exemplary embodiment of the application may not be limited to 3, as shown in FIGS. 4 to 6.

Figure 7:
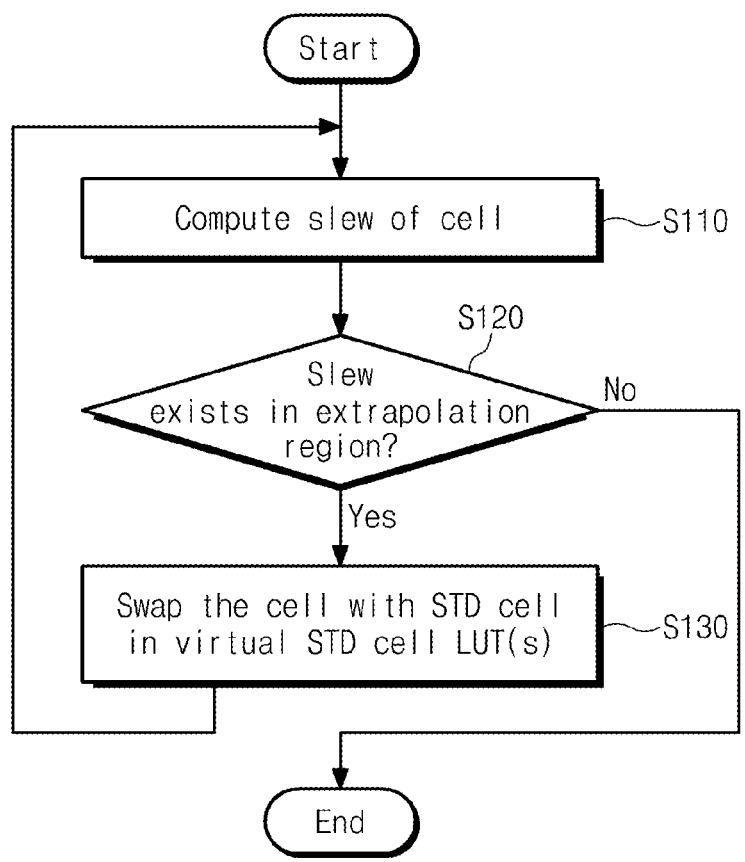
FIG. 7 is a flowchart illustrating a timing matching method of a timing analyzer according to one exemplary embodiment of the application.

FIG. 7 is a flowchart illustrating a timing matching method of a timing analyzer according to one exemplary embodiment of the application.

Referring to FIGS. 1 to 7, a timing matching method of a timing analyzer 130 (refer to FIG. 1) may proceed as follows:

In step S110, the timing analyzer 130 may compute a slew of a target cell. In step S120, the timing analyzer 130 may determine whether the slew of the target cell exists in an ER of a STD cell LUT 110 (refer to FIG. 1). If the slew of the target cell exists in the ER, in step S130, the timing analyzer 130 may swap the target cell with a virtual STD cell of a virtual STD cell LUT 120 (refer to FIG. 1). Thereafter, the timing analyzer 130 may perform the processing from step S110 again. Meanwhile, if the slew of the target cell does not exist in the ER, the timing analyzer 130 may end the timing matching method for the target cell.

In the timing matching method, when the slew of the target cell exists in the ER, the timing analyzer 130 may swap the target cell with a virtual STD cell which exists in a virtual interpolation region (VIR).

As described above, FIG. 7 illustrates the timing matching method according to slews. Meanwhile, a timing matching method according to another exemplary embodiment of the application may proceed according to loads.

Figure 8:
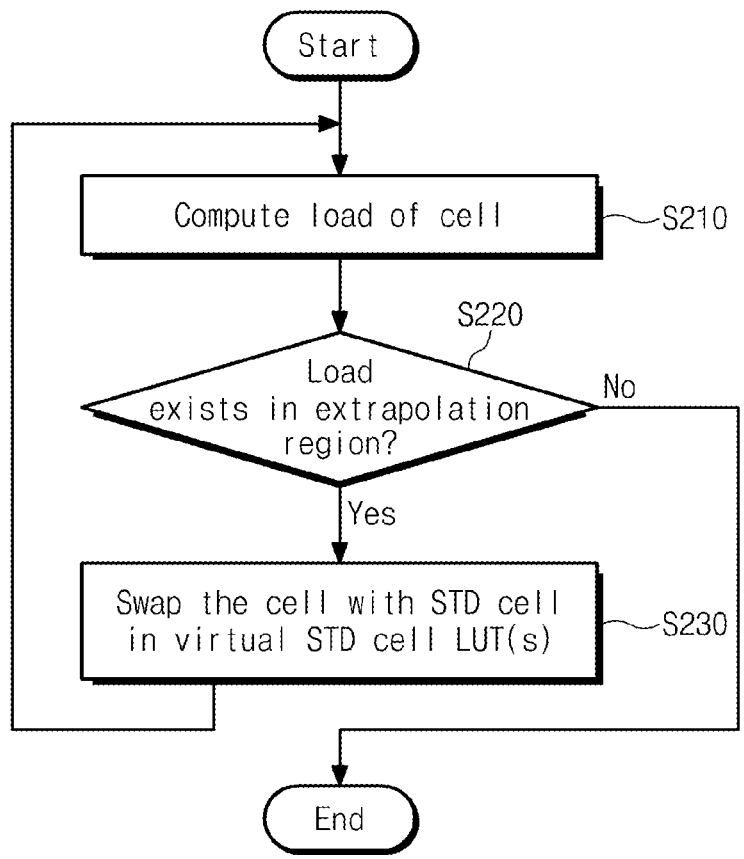
FIG. 8 is a flowchart illustrating a timing matching method of a timing analyzer according to another exemplary embodiment of the application.

FIG. 8 is a flowchart illustrating a timing matching method of a timing analyzer according to another exemplary embodiment of the application.

Referring to FIGS. 1 to 6 and 8, a timing matching method of a timing analyzer 130 (refer to FIG. 1) may proceed as follows:

In step S210, the timing analyzer 130 may compute a load of a target cell. In step S220, the timing analyzer 130 may determine whether the load of the target cell exists in an ER. If the load of the target cell exists in the ER, in step S230, the timing analyzer 130 may swap the target cell with a virtual STD cell of a virtual STD cell LUT 120 (refer to FIG. 1). Thereafter, the timing analyzer 130 may perform the processing from step S210 again. Meanwhile, if the load of the target cell does not exist in the ER, the timing analyzer 130 may end the timing matching method for the target cell.

In the timing matching method, when the load of the target cell exists in the ER, the timing analyzer 130 may swap the target cell with a virtual STD cell which exists in a VIR.

Meanwhile, the timing matching method through the virtual STD cell swap operation according to another embodiment of the application may be implemented to proceed when a target cell is a cell associated with a memory chip.

Figure 9:
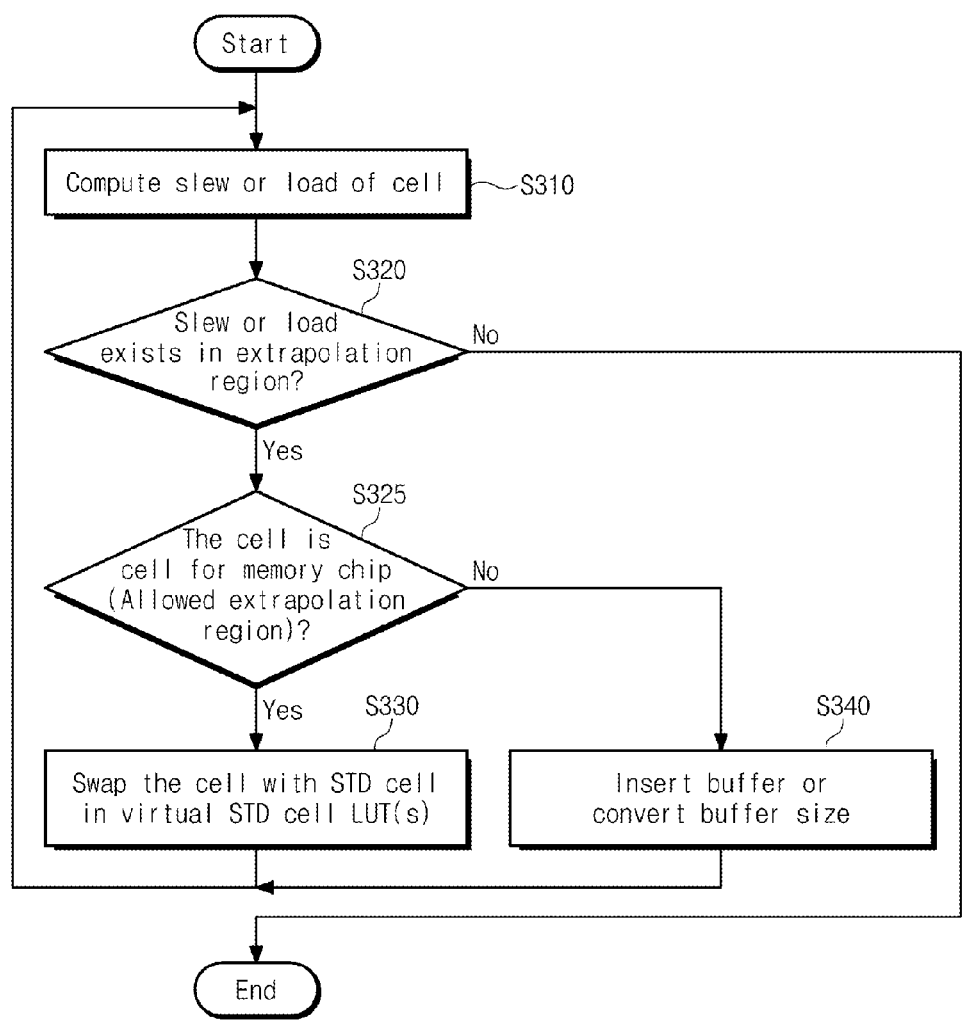
FIG. 9 is a flowchart illustrating a timing matching method of a timing analyzer according to another exemplary embodiment of the application.

FIG. 9 is a flowchart illustrating a timing matching method of a timing analyzer according to another exemplary embodiment of the application.

Referring to FIGS. 1 to 6 and 9, a timing matching method of a timing analyzer 130 (refer to FIG. 1) may proceed as follows:

In step S310, the timing analyzer 130 may compute a slew or load of a target cell. In step S320, the timing analyzer 130 may determine whether the slew or load of the target cell exists in an ER. If the slew or load of the target cell exists in the ER, in step S325, the timing analyzer 130 may determine whether the target cell is a cell for a memory chip. If the target cell is the cell for the memory chip, in step S330, the timing analyzer 130 may swap the target cell with a virtual STD cell of a virtual STD cell LUT 120 (refer to FIG. 1). Thereafter, the timing analyzer 130 may perform the processing from step S310 again. Meanwhile, if the target cell is not the cell for the memory chip (or a data path of the memory chip), in step S340, the timing analyzer 130 may perform timing matching for the target cell by inserting a buffer in the front of the target cell or converting a buffer size. Meanwhile, if the slew or load of the target cell does not exist in the ER, the timing analyzer 130 may end the timing matching method for the target cell.

In the timing matching method, when the target cell is the cell for the memory chip, the timing analyzer 130 may swap the target cell of the ER with a virtual STD cell which exists in a VIR.

Meanwhile, the timing matching method may be considered from the viewpoints of an ER and an IR.

Figure 10:
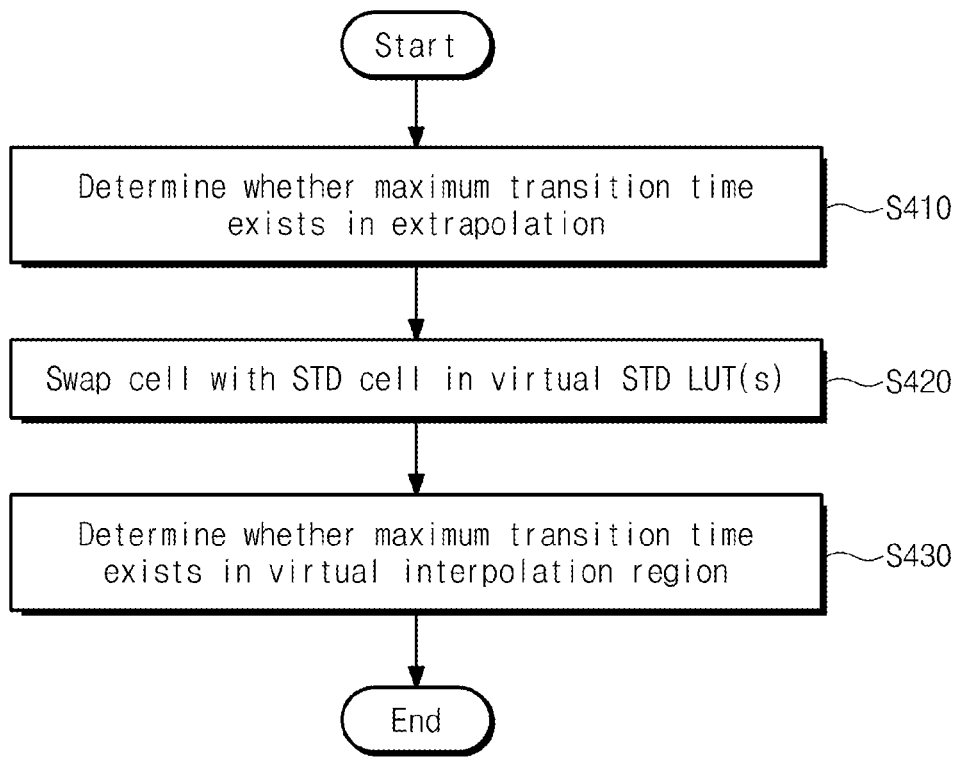
FIG. 10 is a flowchart illustrating a timing matching method of a timing analyzer according to another exemplary embodiment of the application.

FIG. 10 is a flowchart illustrating a timing matching method of a timing analyzer according to another exemplary embodiment of the application.

Referring to FIGS. 1 to 10, a timing analyzer 130 (refer to FIG. 1) proceeds as follows:

In step S410, the timing analyzer 130 may determine whether a maximum transition time of a target cell exists in an ER. If the maximum transition time of the target cell exists in the ER, in step S420, the timing analyzer 130 may swap the target cell with a virtual STD cell of a virtual STD cell LUT 120 (refer to FIG. 1). Thereafter, in step S430, the timing analyzer 130 may determine whether a maximum transition time of the swapped target cell exists in a VIR. Herein, the VIR may be a part of the ER. If the maximum transition time exists in an IR or a VIR, the timing analyzer 130 may end the timing matching method.

In the timing matching method, when the maximum transition time of the target cell exists in the ER, the timing analyzer 130 may perform a STD cell swap operation such that the target cell exists in the IR or the VIR.

Figure 11:
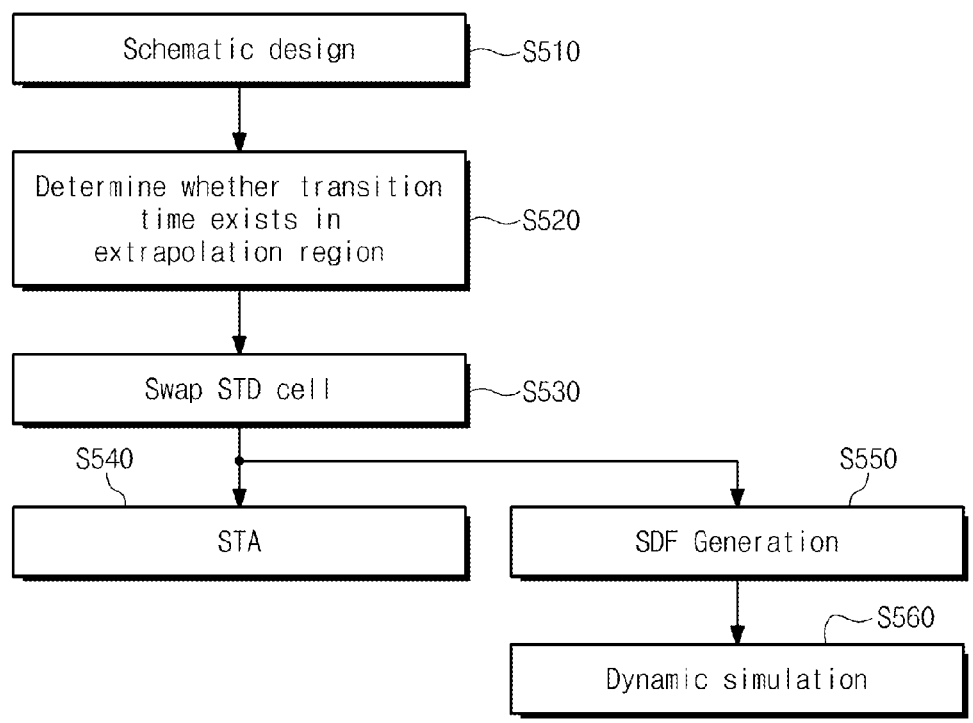
FIG. 11 is a flowchart illustrating an exemplary chip design process according to one exemplary embodiment of the application.

FIG. 11 is a flowchart illustrating an exemplary chip design process according to one exemplary embodiment of the application.

Referring to FIGS. 1 to 11, a chip design process proceeds as follows:

In step S510, a circuit for performing functions according to a client's request is designed. In step S520, a timing analyzer 130 (refer to FIG. 1) may determine whether a transition time of a cell constituting the designed circuit exists in an ER. In step S530, the timing analyzer 130 may swap the cell which exists in the ER with a STD cell of an IR or a virtual STD cell of a VIR. Thereafter, in step S540, the timing analyzer 130 may perform an STA operation. The STA operation may be performed to measure a setup time, a hold time, and a clock skew which are requested by each cell in consideration of delay information and process problems associated with timing in advance. In an exemplary embodiment of the application, the timing analyzer 130 may be at least one of PrimeTime, Star-sim, etc.

Also, in step S550, the timing analyzer 130 may generate a standard delay format (SDF) for a DTA operation. In step S560, the timing analyzer 130 may perform a dynamic simulation using the SDF file and a design netlist synthesized with a gate level. Herein, the dynamic simulation may be performed by a verilog simulator. The verilog simulator may be at least one of ModelSim, Verilog-XL, NC-verilog, VCS, FineHDL, Silo III, etc.

Figure 12:
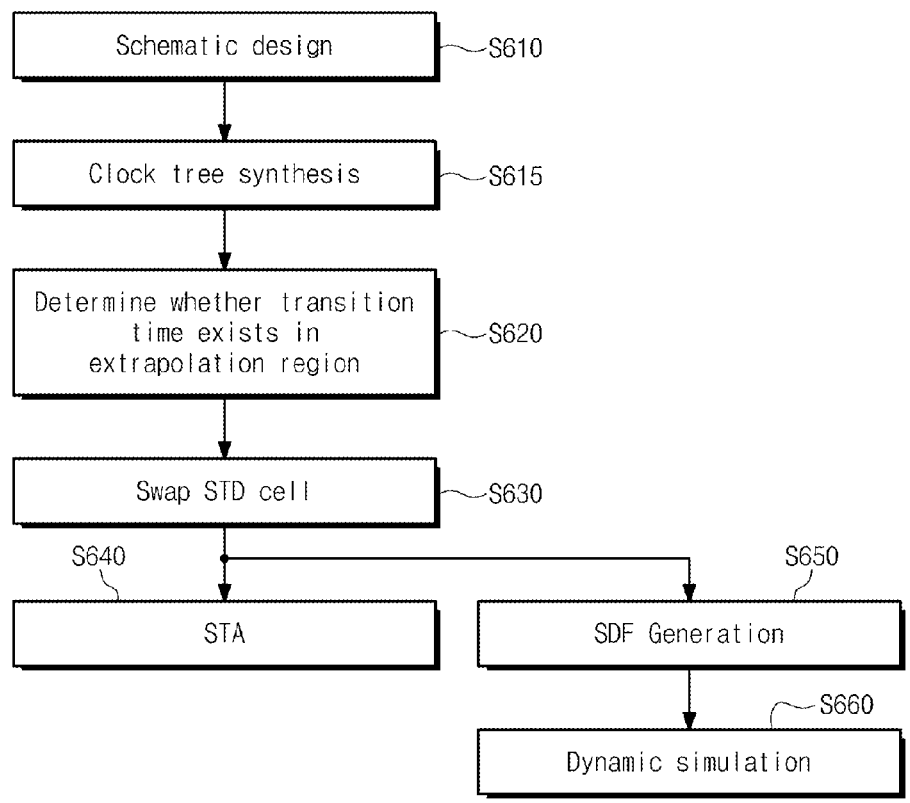
FIG. 12 is a flowchart illustrating an exemplary chip design process according to another exemplary embodiment of the application.

FIG. 12 is a flowchart illustrating an exemplary chip design process according to another exemplary embodiment of the application.

Referring to FIGS. 1 to 10 and 12, a chip design process may proceed as follows:

In step S610, a schematic design for a necessary circuit may be performed. A netlist of respective cells constituting the circuit may be extracted. In step S615, a timing analyzer 130 (refer to FIG. 1) may perform buffer insertion for satisfying a clock skew and a setup/hold time. This may be referred to as clock tree synthesis. Synchronized clocks may be inserted by dividing one clock source in the clock tree synthesis. Thereafter, in step S620, the timing analyzer 130 may determine whether a cell of the circuit exists in an ER. In step S630, the timing analyzer 130 may swap the cell which exists in the ER with a STD cell in an IR or a virtual STD cell of a VIR. Thereafter, in step S640, the timing analyzer 130 may perform an STA operation. Meanwhile, if there is no timing violation, in step S650, the timing analyzer 130 may generate an SDF file for the DTA operation. In step S660, the timing analyzer 130 may perform a dynamic simulation using the SDF file and a design netlist synthesized with a gate level.

Figure 13:
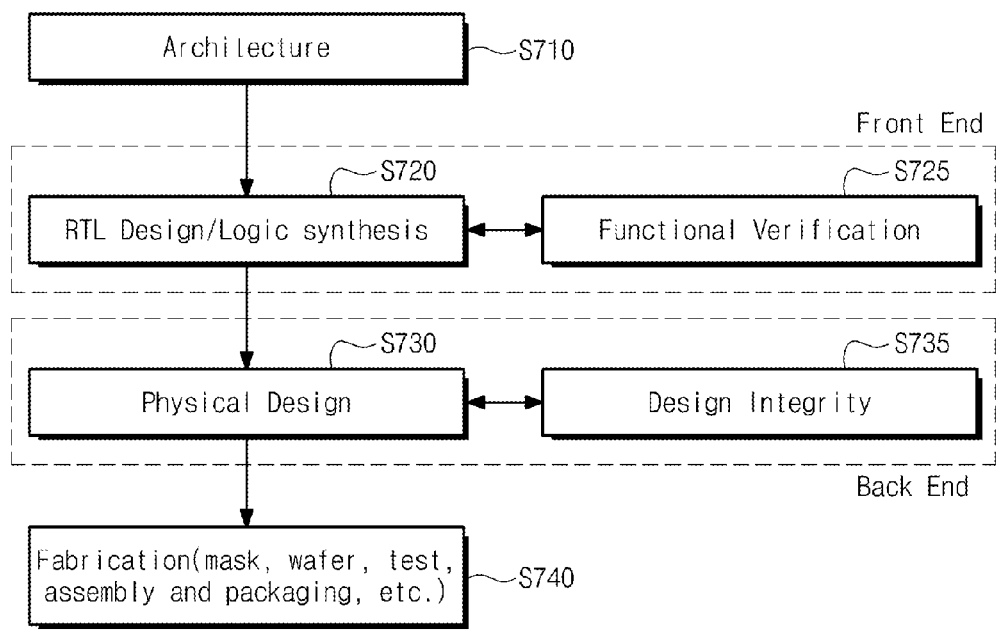
FIG. 13 is a flowchart illustrating a rough method of fabricating a non-memory chip according to an exemplary embodiment of the application.

FIG. 13 is a flowchart illustrating a rough method of fabricating a non-memory chip according to an exemplary embodiment of the application.

Referring to FIGS. 1 to 13, a method of fabricating a non-memory may proceed as follows:

In step S710, an integrated circuit for the non-memory chip may be designed. In step S720, a register transfer level (RTL) design/logic synthesis may be performed. An RTL may be used for indicating a coding style used in hardware description languages for effectively ensuring that code models may be synthesized in a certain hardware platform such as an FPGA or an ASIC (that is, code models may be converted into real logic functions). There are a plurality of hardware description languages used for generating RTL modules. The plurality of hardware description languages may be System Verilog, Verilog, verilog hardware description language (VHDL), etc. Thereafter, in step S725, functional verification for the synthesized logic may be performed. In order to improve static timing matching properties or dynamic timing matching properties in the functional verification, a timing analysis method shown in FIGS. 1 to 12 may be applied. For example, timing matching may be realized by swapping a target cell of an ER with a virtual STD cell of an IR of the ER.

If this function verification is completed, in step S730, a physical design (e.g., a layout) may be achieved. Herein, the layout may be a process of making data necessary for fabricating a mask for implementing an integrated circuit on a wafer. Also, the layout may mean a series of works for placing and routing semiconductor devices (e.g., transistors, resistors, capacitors, etc.) having electric characteristics along a designed circuit to be suitable for a layout design rule required by a semiconductor process. A layout method may be classified into a full custom type for manually performing a work according to a work type using a layout editor, an auto place & routing (P & R) type using an auto place/routing tool, and a semi-custom type using all of the aforementioned types. After designing the layout, in step S735, design integrity may be verified. Verified items may be a design rule check (DRC) for checking whether a layout is correctly designed to be suitable for a design rule, an electric rule check (ERC) for checking whether the layout is correctly designed in the inside without being electrically disconnected, or a layout vs schematic (LVS) for verifying whether a layout is identical to a gate level netlist, etc.

Thereafter, in step S740, the non-memory chip may be fabricated by a mask, a wafer, a test, an assembly, packaging, etc.

Figure 14:
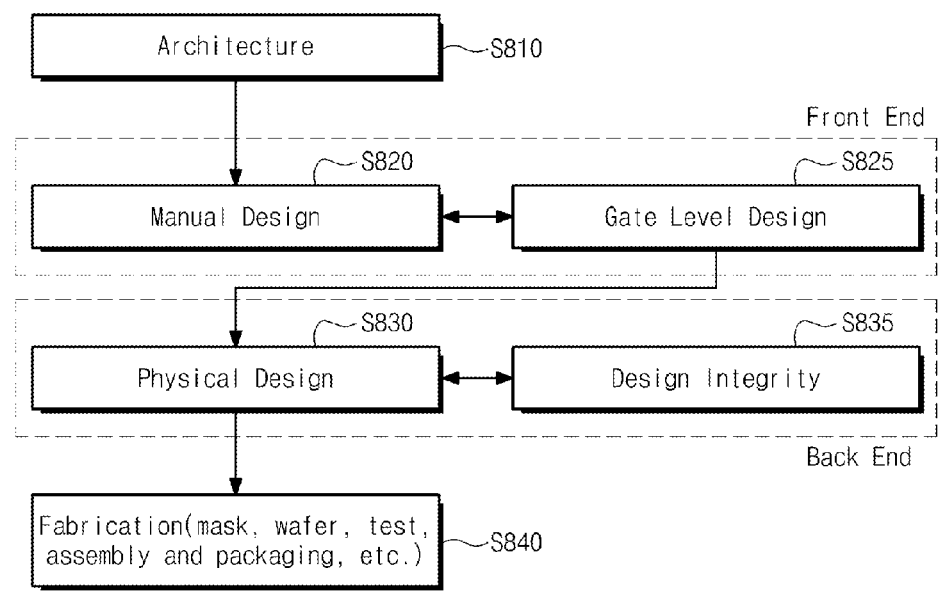
FIG. 14 is a flowchart illustrating a rough method of fabricating another memory chip according to an exemplary embodiment of the application.

FIG. 14 is a flowchart illustrating a rough method of fabricating another memory chip according to an exemplary embodiment of the application.

In step S810, a schematic design for a memory chip may be performed. In step S820, a manual design for performing circuit synthesis according to the schematic design may be achieved. In step S825, a gate level design may be achieved. Herein, the gate level design may include a gate level timing simulation. In order to improve static timing matching properties or dynamic timing matching properties, a timing analysis method shown in FIGS. 1 to 12 may be applied. For example, timing matching may be realized by swapping a target cell of an ER with a virtual STD cell of an IR of the ER. In step S830, a physical design may be achieved. In step S835, design integrity may be verified. Thereafter, in step S840, the non-memory chip may be fabricated by a mask, a wafer, a test, an assembly, packaging, etc.

Figure 15:
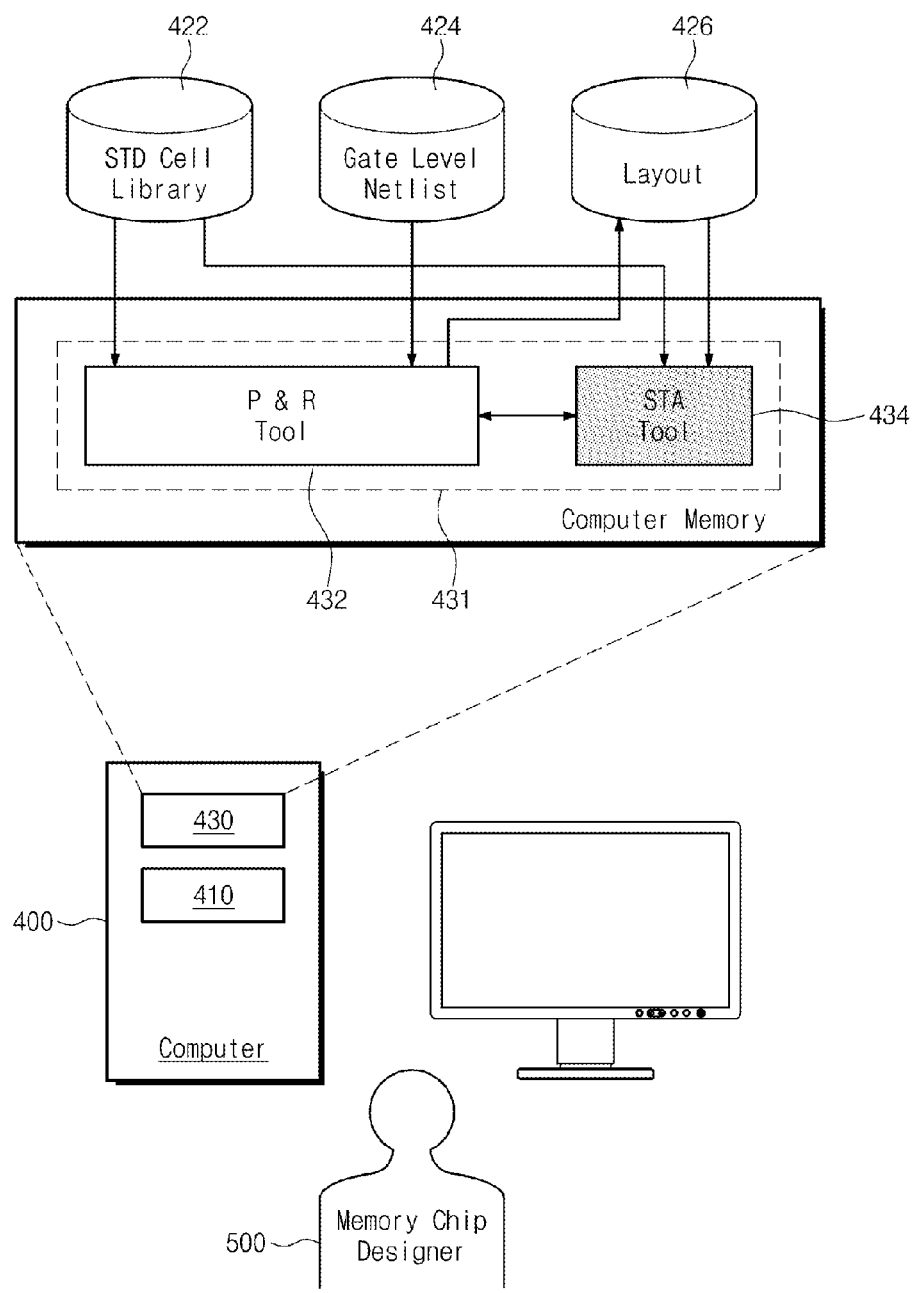
FIG. 15 is a block diagram illustrating a design system for designing a memory chip according to an exemplary embodiment of the application.

FIG. 15 is a block diagram illustrating a design system for designing a memory chip according to an exemplary embodiment of the application.

Referring to FIG. 15, the design system (e.g., computer) denoted by 400 may include a memory device 430 into which a design tool 431 for designing a memory chip is loaded and a processor 410 for executing the design tool 431 loaded into the memory device 430.

The processor 410 may load the design tool 431, such as an electronic design automation (EDA) tool, into the memory device 430. For example, the processor 410 may load the design tool 431 into the memory device 430 from storage devices, such as a solid state drive, a hard disk drive, and a compact disc-read only memory (CD-ROM).

The processor 410 may execute the design tool 431 to implement the memory chip. The design tool 431 executed by the processor 410 may implement an SoC based on a STD cell library 422. For example, the processor 412 may execute a P & R tool 432 and an STA tool 434. In an exemplary embodiment of the application, the STA tool 434 may be implemented by a timing matching method shown in FIGS. 1 to 12. Also, the P & R tool 432 executed by the processor 410 may generate layout data 426 for the memory chip by placing and routing components of the memory chip based on the STD cell library and a gate level netlist 424. There may be databases which store the STD cell library 422, the gate level netlist 424, and the layout data 426. Also, the STA tool 434 executed by the processor 410 may verify timing of the layout data 426 for the memory chip based on timing parameters included in the STD cell library 422. Meanwhile, the design system 400 may provide results of respective processes while implementing the memory chip to a memory chip designer 500 through an output device such as a display device and may receive feedback through an input device such as a keyboard from the memory chip designer 500. Therefore, the memory chip may be fabricated and packaged based on the layout data 426 in which timing verification is completed.

As described above, the timing matching method of the timing analyzer and the method of designing the integrated circuit may achieve timing matching, without converting a buffer size, by swapping a target cell with a virtual STD cell of an ER.

While the application has been described with reference to exemplary embodiments, it will be apparent to those skilled in the art that various changes and modifications may be made without departing from the spirit and scope of the application. Therefore, it should be understood that the above embodiments are not limiting, but illustrative.

What is claimed is:

1. A timing matching method, executed by a system that includes a memory that stores instructions for analyzing timing of an integrated circuit and a processor that executes the instructions to perform the method, the method comprising:
   computing a slew or load of a cell;
   determining whether the slew or load exists in an extrapolation region of a standard cell look-up table; and
   swapping the cell with a virtual standard cell of a virtual standard cell look-up table based on determining that the slew or load exists in the extrapolation region,
   wherein the integrated circuit is designed based on completing the timing matching method, and
   wherein the integrated circuit is fabricated based on layout data on which the timing matching method is completed.

2. The timing matching method of claim 1,
   wherein the cell has the same size as the virtual standard cell.

3. The timing matching method of claim 1, wherein the standard cell look-up table is a table associated with timing matching of standard cells used in a large scale integration (LSI) design.

4. The timing matching method of claim 1, wherein the virtual standard cell look-up table is a table associated with timing matching of virtual standard cells used in a memory chip design.

5. The timing matching method of claim 1, further comprising determining whether the cell is a cell used in a memory chip, when the slew or load exists in the extrapolation region.

6. The timing matching method of claim 5, further comprising swapping the cell with the virtual standard cell, based on determining that the cell is the cell used in the memory chip.

7. The timing matching method of claim 1, further comprising swapping the cell with a standard cell in the standard cell look-up table, when a timing violation occurs in a timing analysis of the cell.

8. The timing matching method of claim 1, further comprising computing a slew or load of the virtual standard cell, after swapping the cell with the virtual standard cell.

9. The timing matching method of claim 8, further comprising determining whether the slew or load of the virtual standard cell exists in a virtual interpolation region of the virtual standard cell look-up table.

10. The timing matching method of claim 1, further comprising generating a standard delay format file, when there is no timing violation in a timing analysis of the cell or virtual standard cell.

11. The timing matching method of claim 10, further comprising performing a dynamic simulation using the standard delay format file and a gate level netlist.

12. The timing matching method of claim 1,
   wherein the slew comprises a transition time,
   the determining whether the slew or load exists in the extrapolation region comprises determining whether the transition time of the cell exists in the extrapolation region of the standard cell look-up table, and
   the swapping comprises swapping the cell with the virtual standard cell of the virtual standard cell look-up table, based on determining that the transition time of the cell exists in the extrapolation region of the standard cell look-up table.

13. The timing matching method of claim 12, further comprising:
   determining whether a transition time of the virtual standard cell exists in a virtual interpolation region of the virtual standard cell look-up table,
   wherein the virtual interpolation region is included in the extrapolation region.

14. The timing matching method of claim 1, further comprising:
   performing a physical design by placing and routing cells using the virtual standard cell swapped for the cell.

15. The timing matching method of claim 14, further comprising:
   verifying the physical design through a design rule check (DRC), a layout and netlist comparison check (LVS), or an electronic rule check (ERC).

16. The timing matching method of claim 1, wherein the integrated circuit is a memory chip.

17. A timing matching method, executed by a system that includes a memory that stores instructions for analyzing timing of an integrated circuit and a processor that executes the instructions to perform the method, the method comprising:
   computing a slew or load of a cell;
   determining whether the slew or load exists in an extrapolation region of a standard cell look-up table;
   swapping the cell with a virtual standard cell of a virtual standard cell look-up table based on determining that the slew or load exists in the extrapolation region;
   determining whether the cell is a cell used in a memory chip, when the slew or load exists in the extrapolation region; and
   inserting a buffer into an input end of the cell or converting a size of a buffer in the input end of the cell, when the cell is not the cell used in the memory chip,
   wherein the integrated circuit is designed based on completing the timing matching method, and
   wherein the integrated circuit is fabricated based on layout data on which the timing matching method is completed.

* * * * *